US010264890B2

(12) United States Patent
Aldrich et al.

(10) Patent No.: US 10,264,890 B2
(45) Date of Patent: Apr. 23, 2019

(54) BACK SUPPORT

(71) Applicant: Herman Miller, Inc., Zeeland, MI (US)

(72) Inventors: John F. Aldrich, Grandville, MI (US);
Brock Walker, Okemos, MI (US);
Thomas Hornor, Holland, MI (US);
Don Chadwick, Los Angeles, CA (US);
Jeffrey Koffman, Santa Monica, CA (US)

(73) Assignee: HERMAN MILLER, INC., Zeeland, MI (US)

( * ) Notice: Subject to any disclaimer, the term of this patent is extended or adjusted under 35 U.S.C. 154(b) by 329 days.

(21) Appl. No.: 15/197,275

(22) Filed: Jun. 29, 2016

(65) Prior Publication Data
US 2016/0374475 A1 Dec. 29, 2016

Related U.S. Application Data

(60) Provisional application No. 62/185,928, filed on Jun. 29, 2015, provisional application No. 62/349,536, filed on Jun. 13, 2016.

(51) Int. Cl.
*A47C 7/46* (2006.01)
*B60N 2/66* (2006.01)

(52) U.S. Cl.
CPC .............. *A47C 7/462* (2013.01); *A47C 7/46* (2013.01); *B60N 2/66* (2013.01); *B60N 2/666* (2015.04); *B60N 2/6671* (2015.04); *B60N 2/6673* (2015.04)

(58) Field of Classification Search
CPC .. A47C 7/46; A47C 7/462; B60N 2/66; B60N 2/6671; B60N 2/6673; B60N 2/666
(Continued)

(56) References Cited

U.S. PATENT DOCUMENTS

| 4,502,728 A | 3/1985 | Sheldon et al. |
| 4,541,670 A | 9/1985 | Morgenstern et al. |

(Continued)

FOREIGN PATENT DOCUMENTS

| EP | 0130169 | 1/1985 |
| EP | 0419714 | 9/1989 |

(Continued)

OTHER PUBLICATIONS

Search Report for International Application No. PCT/US2016/040113 dated Sep. 28, 2016 (3 pages).

(Continued)

*Primary Examiner* — Syed A Islam
(74) *Attorney, Agent, or Firm* — Michael Best & Friedrich LLP

(57) ABSTRACT

A back support structure includes a frame, a support, a fulcrum member, and an adjustment mechanism. The support includes an upright member having a lower end and an upper end. The lower end of the upright member is connected to the frame at a first location. A support pad is connected to the upper end of the upright member. The fulcrum member has an upper portion and a lower portion. The upper portion is connected to the frame at a second location spaced vertically above the first location. The fulcrum member includes a fulcrum engaging the upright member between the upper and lower ends. The fulcrum member is moveable between a plurality of fulcrum positions. The adjustment mechanism includes an adjustment member connected to the frame and the lower portion of the fulcrum member. The adjustment member is adjustable to move the fulcrum member to the plurality of fulcrum positions.

20 Claims, 14 Drawing Sheets

(58) Field of Classification Search
USPC .................. 297/284.3, 284.4, 284.7, 284.8
See application file for complete search history.

(56) References Cited

U.S. PATENT DOCUMENTS

| | | | |
|---|---|---|---|
| 4,883,320 A | 11/1989 | Izumida et al. | |
| 4,981,325 A | 1/1991 | Zacharkow | |
| 5,101,811 A | 4/1992 | Brunswick | |
| 5,507,559 A | 4/1996 | Lance | |
| 5,577,811 A | 11/1996 | Ogg | |
| 5,590,427 A | 1/1997 | Weterings et al. | |
| 5,704,689 A * | 1/1998 | Kim | A47C 7/441 297/301.4 |
| 5,887,951 A | 3/1999 | Willingham | |
| 5,967,608 A | 10/1999 | Van Sickle | |
| 6,056,361 A * | 5/2000 | Cvek | A47C 3/021 297/173 |
| 6,079,785 A | 6/2000 | Peterson et al. | |
| 6,125,521 A | 10/2000 | Stumpf et al. | |
| 6,125,851 A | 10/2000 | Walker et al. | |
| 6,354,662 B1 | 3/2002 | Su | |
| 6,471,294 B1 | 10/2002 | Dammermann et al. | |
| 6,572,190 B2 | 6/2003 | Koepke et al. | |
| 6,843,530 B1 * | 1/2005 | Wu | A47C 7/38 297/284.3 |
| 6,913,315 B2 | 7/2005 | Ball et al. | |
| 7,347,495 B2 * | 3/2008 | Beyer | A47C 7/462 297/284.3 |
| 7,841,666 B2 * | 11/2010 | Schmitz | A47C 1/03255 297/284.4 |
| 7,878,591 B2 * | 2/2011 | Walker | A47C 7/46 297/284.4 |
| 7,963,606 B2 | 6/2011 | Sanchez | |
| 2004/0075319 A1 * | 4/2004 | VanSickle | A47C 7/465 297/284.4 |
| 2005/0062323 A1 * | 3/2005 | Dicks | A47C 7/38 297/284.4 |
| 2007/0080570 A1 | 4/2007 | Kohl et al. | |

FOREIGN PATENT DOCUMENTS

| | | |
|---|---|---|
| EP | 0904761 | 3/1991 |
| GB | 2231257 | 11/1990 |
| GB | 2235369 | 6/1991 |
| GB | 2178652 | 2/1997 |
| KR | 200397891 | 10/2005 |
| KR | 200421443 | 7/2006 |
| KR | 100886008 | 2/2009 |
| WO | 8404873 | 12/1984 |

OTHER PUBLICATIONS

Written Opinion for International Application No. PCT/US2016/040113 dated Sep. 28, 2016 (10 pages).

* cited by examiner

BACK SUPPORT

CROSS-REFERENCE TO RELATED APPLICATIONS

This application claims priority to U.S. Provisional Patent Application No. 62/185,928, filed Jun. 29, 2015, and U.S. Provisional Application No. 62/349,536, filed Jun. 13, 2016, the entire contents of which are incorporated by reference herein.

FIELD OF THE INVENTION

The present application relates generally to a body support structure, and in particular, to a back support providing lumbar and sacral support, together with methods of use and assembly.

BACKGROUND

Seating structures may be configured with flexible backrest members, such as polypropylene sheets and woven elastomeric membranes. Typically, the flexible members are put in tension in various ways so as to provide the flexible member with a three-dimensional contour.

Although a flexible backrest can accommodate movements and shifts in the users positions some users become uncomfortable after sitting for long periods of time. This is particularly true if the person sitting in the chair is restricted in the postural positions that he or she can assume for reasons such as the work task that they are performing.

The spine is broken down into four general regions: cervical (neck), thoracic (upper back), lumbar (lower back) and sacral (tail bone). In a natural aligned spine, the thoracic spine has a kyphotic, or gentle convex curve when viewed from the side. A lordotic lumbar spine, when viewed from the side, has a slightly concave curve. The sacrum is the base of the spine. It is a large triangular fusion of five vertebrae wedged between the pelvic bones. The connection of these bones is called the sacroiliac joint. Back problems can occur where the lumbar spine connects to the sacrum.

Sitting up straight can be difficult for the users of many chairs. In particular, in many seating devices a void exists between the backrest of the chair and the sacrum of a user. As a result, the user of the chair may take a slouched position. By slouching, the user will be placed in a position of poor posture, lack of muscle control and discomfort. Slouching can lead to a number of immediate problems. For example, increased fatigue or fidgeting may result because of discomfort. In addition, undesirable physical effects such as increased pressure on the lumbar discs or the creation of muscle spasms may also result from slouching. Various long-term problems may also occur. For example, pain in the lower back muscles or discomfort between the shoulder blades may result. Also, the tightening of neck muscles and muscle soreness and headaches may result.

The lumbar vertebrae, located in the small of the back and the surrounding muscles, tendons and ligaments are a common source of discomfort for a great many people after setting for prolonged periods. This source of discomfort can be precipitated by a person setting in a chair for long periods or setting in a chair in the same position for a long period of time.

Back support structures are often configured with a lumbar and/or sacral support. Often, however, one or both of the lumbar and sacral supports are not adjustable, which may limit the ability of the user to tune or optimize the support in the desired regions. Alternatively, a single pad may be provided, which may limit the ability to differentiate support in the desired lumbar and sacral areas. In addition, the adjustment of the lumbar and/or sacral support may be limited.

SUMMARY

According to an exemplary embodiment, a back support structure includes a frame, a support, a fulcrum member, and an adjustment mechanism. The support includes an upright member having a lower end and an upper end. The lower end of the upright member is connected to the frame at a first location. A support pad is connected to the upper end of the upright member. The fulcrum member has an upper portion and a lower portion. The upper portion is connected to the frame at a second location spaced vertically above the first location. The fulcrum member includes a fulcrum engaging the upright member between the upper and lower ends. The fulcrum member is moveable between a plurality of fulcrum positions. The adjustment mechanism includes an adjustment member connected to the frame and the lower portion of the fulcrum member. The adjustment member is adjustable so as to move the fulcrum member to the plurality of fulcrum positions.

According to another exemplary embodiment, a back support includes a frame. A stem having a lower portion and an upper portion is connected to the frame. The upper portion of the stem being moveable with respect to the lower portion. A first support pad is pivotally connected to the upper portion of the stem. A second support pad is pivotally connected to the stem between the upper portion and the lower portion.

A yoke is connected to the frame. The yoke has a protrusion engaging the stem. The yoke is configured to pivot about a first axis. An adjustment mechanism is configured to pivot the yoke about the first axis.

According to another exemplary embodiment, is directed to a method of adjusting a back support structure. An upright member is pivotally supported about a first axis. A fulcrum member is pivotally supported about a second axis, wherein the second axis is spaced apart from the first axis. The upright member is engaged with the fulcrum member between the first and second axes. A strap attached to the fulcrum member is translated. The fulcrum member is pivoted about the second axis in response to translating the strap. The upright member is pivoted about the first axis in response to pivoting of the fulcrum member.

The foregoing paragraphs have been provided by way of general introduction, and are not intended to limit the scope of the following claims. The various preferred embodiments, together with further advantages, will be best understood by reference to the following detailed description taken in conjunction with the accompanying drawings.

DETAILED DESCRIPTION OF EXEMPLARY EMBODIMENTS

Various exemplary embodiments are related to seating structures and methods of creating seating structures. Seating structures may include any structure used to support a body of a user, for example, without limitation, office chairs, chairs, sofas, airplane seats, vehicle seats, bicycle seats, boat seats, beds, dental and medical seats and beds, auditorium and educational seating, etc. It should be understood that the various methods and devices disclosed herein may be applied to seating structures other than a seat and/or backrest, including for example and without limitation armrests, headrests and other ergonomic positioning features. In addition, the various methods and devices may be applied to structures employing a frame and suspension material other than seating structures. Although the illustrated embodiments are shown in connection with an office chair, other embodiments can include different configurations.

Figure 1:
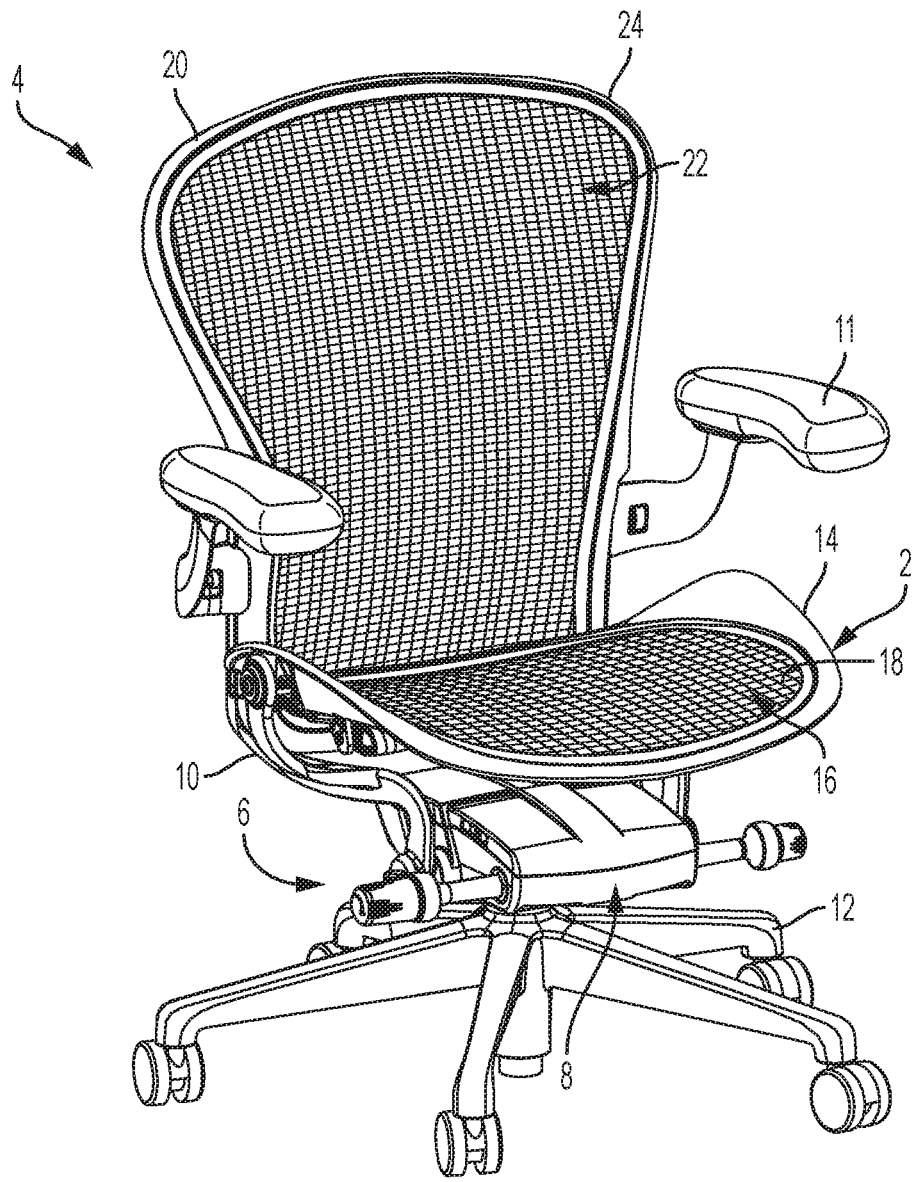
FIG. 1 is a front perspective view of an exemplary chair.

FIG. 1 shows an exemplary embodiment of a seating structure configured as a chair that includes a seat 2, a backrest 4 and a base 6. The base includes a tilt control housing 8, a support column 10 coupled to and supporting the tilt control housing 8 and a base structure 12 coupled to and supporting the support column 10. A pair of armrests 11 may be connected to the chair.

The seat 2 includes a frame 14, a suspension material 16, and a carrier 18. The carrier 18 retains the suspension material 16 and connects to the frame 14. In the exemplary embodiments shown, the frame 14 is formed as a ring having a front, a back, and a pair of sides defining an opening. The frame 14 may also be formed from side members, a top member, and a bottom member. Different sizes, shapes, and configurations of the frame 14 can be used according to aesthetics, ergonomics, space, or other considers. The frame 14 may be integrally formed as a single, homogenous unit, or formed of separate components.

The backrest 4 includes a frame 20, a suspension material 22, and a carrier 24. The carrier 24 retains the suspension material 22 and connects to the frame 20. In the exemplary embodiments shown, the frame 20 is formed as a ring having a front, a back, and a pair of sides defining an opening. The frame 20 may also be formed from side members, a top member, and a bottom member. Different sizes, shapes, and configurations of the frame 20 can be used according to aesthetics, ergonomics, space, or other considers. The frame 20 may be integrally formed as a single, homogenous unit, or formed of separate components.

Various methods of connecting the suspension material 16, 22 can be used, including bonding and adhesive or mechanical fasteners, such as staples, or in-molding. When the carrier 18, 24 is engaged with the frame 14, 20, the suspension material 16, 22 spans across the seat 2 and backrest 4 openings.

The suspension material 16, 22 may be made of a woven or knit material, including various elastomeric materials, or fabrics, or various molded polymeric materials. The seat 2 and backrest 4 may utilize the same type of material or different materials for the suspension material 16, 22. In various exemplary embodiments, the suspension material 16, 22 can include a plurality of monofilaments interlaced with a plurality of multifilament strands. The monofilaments can be the primary load carrying members and run laterally in the warp direction of the seat 2 and backrest 4 while the multifilament strands run longitudinally in the weft direction. Additionally, monofilaments and/or multifilaments may be combined to run in both the lateral and longitudinal directions if necessary.

Figure 2:
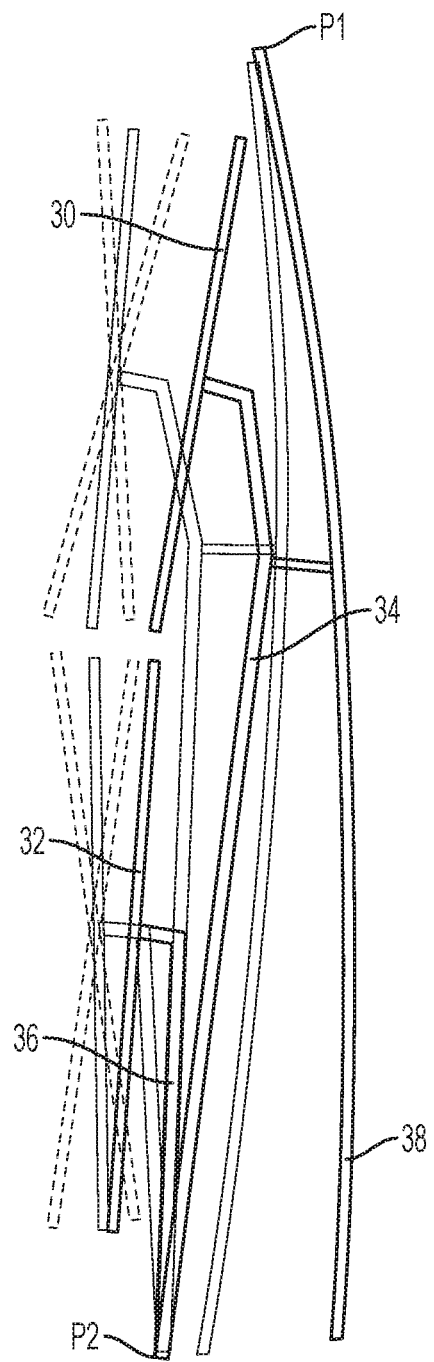
FIG. 2 is a schematic view of the relative movement between positions of an exemplary back support and a fulcrum member.

FIG. 2 shows an exemplary embodiment of a support member having a first or upper support pad 30 and a second or lower support pad 32 provided with multiple degrees of freedom of movement. First and second upright members 34, 36, or beams, can independently flexed in a fore/aft direction. At the same time, movement by a single fulcrum member 38, for example about a first point P1 will move both beams 34, 36 fore/aft, for example about a second point P2 due to the connection between the lower portions thereof, with the upper support pad 30 moving a greater distance than the lower support pad 32. In addition, each support pad 30, 32 may be pivoted or rotated about a horizontal axis where the pad is connected to the upright member or beam 34, 36. The lower portion of the upper support pad 30, and the upper portion of the lower support 32 pad can orient to align with the user's sacrum and L1/T12 transition area.

The pivoting of the first and second uprights 34, 36 about the lower pivot axis provides for a greater forward displacement of the first support pad 30, located adjacent the lumbar region of the user, than the forward displacement of the second support pad 32, located adjacent the sacral region of the user. In some embodiments, the displacement ratio is about 2:1. At the same time, the support pads 30, 32 connected to each upright member or beam 34, 36 are independently flexible about virtual pivot axes defined at the connection points with the uprights.

Figure 3:
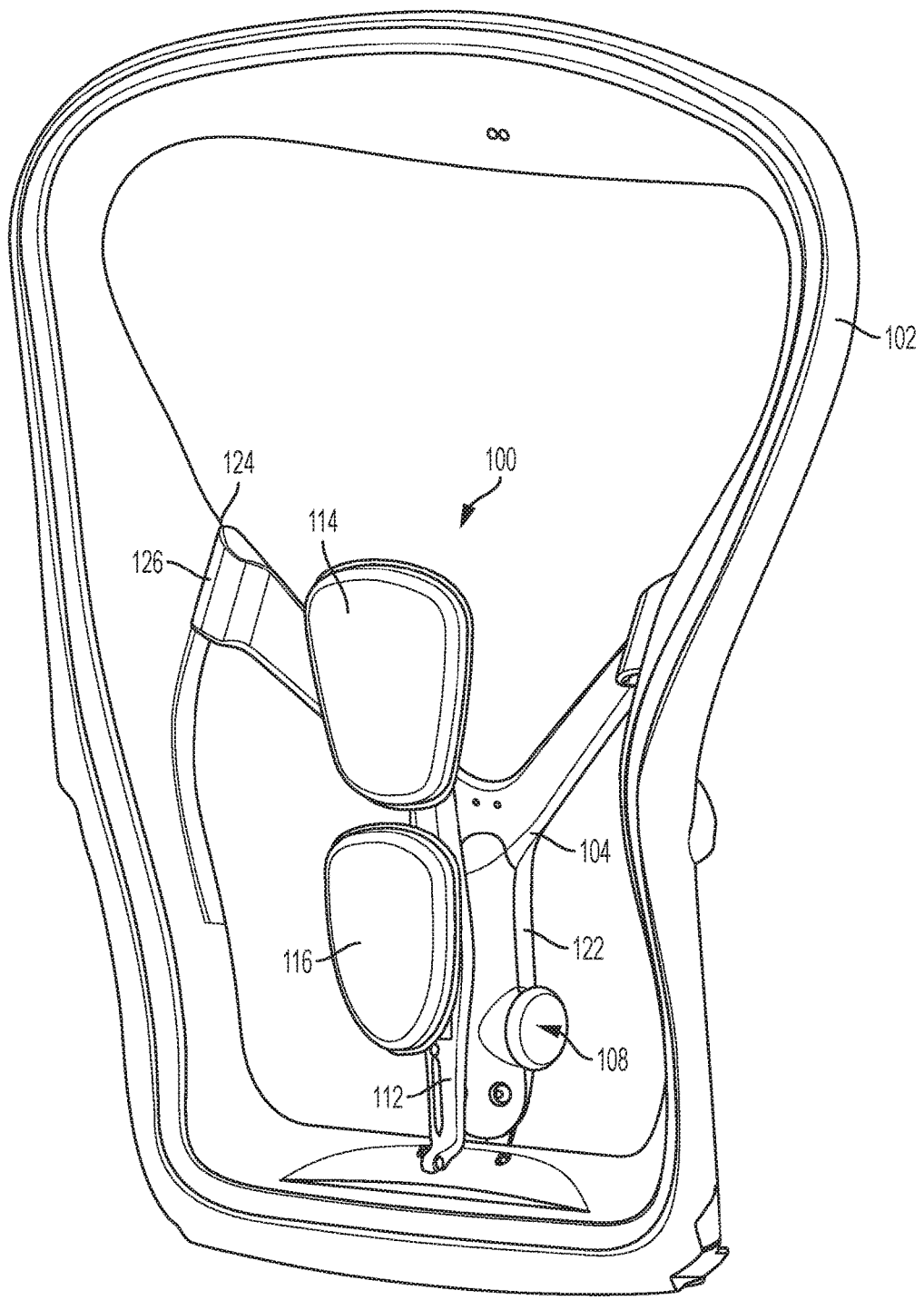
FIG. 3 is a front perspective view of an exemplary back support and chair frame.
Figure 4:
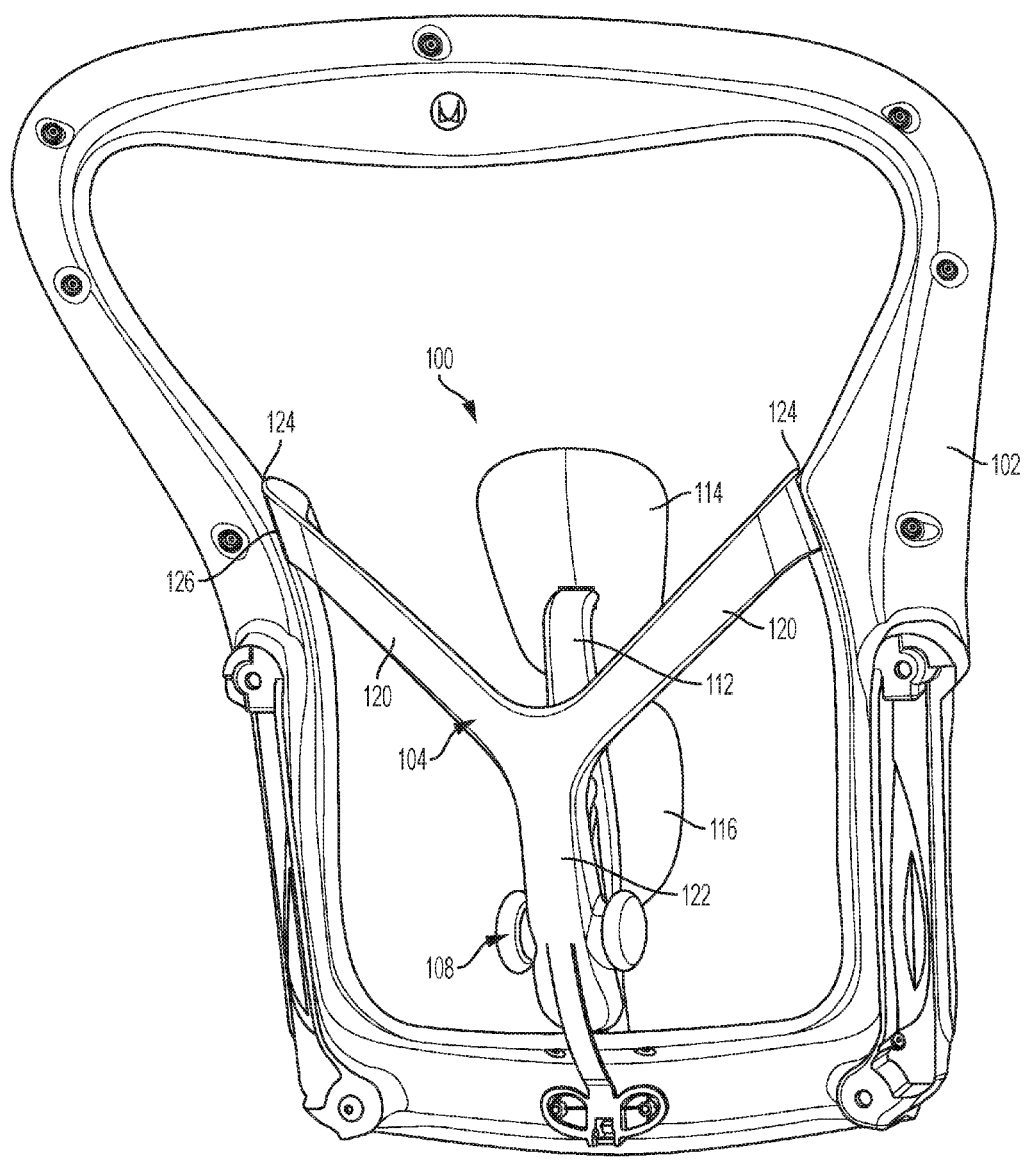
FIG. 4 is a rear perspective view of FIG. 3.

FIGS. 3 and 4, show an exemplary embodiment of a back support 100 connected to an exemplary chair frame 102. The back support 100 includes a fulcrum member, configured in one embodiment as a Y-shaped yoke 104, an adjustment mechanism 108, a stem 112, a first pad 114, and a second pad 116.

The yoke 104 includes a pair of laterally extending arms 120 and a lower portion 122 extending downwardly from the arms 120. The arms 120 are connected to the frame 102, for example by engaging a track 124 of the frame. A channel 126 can be formed on the end of the arms 120 to engage with the track 124. The yoke 104 is pivotable inwardly and outwardly relative to the frame about a pivot axis at a vertical location. The arms 120 can be fixed to the frame, but be flexible or bendable about a virtual axis, or can be moved through a combination of pivoting and bending. The axis may have a horizontal orientation, or at some other orientation, while allowing the yoke 104 to pivot forwardly and rearwardly relative to the frame 102.

Figure 5:
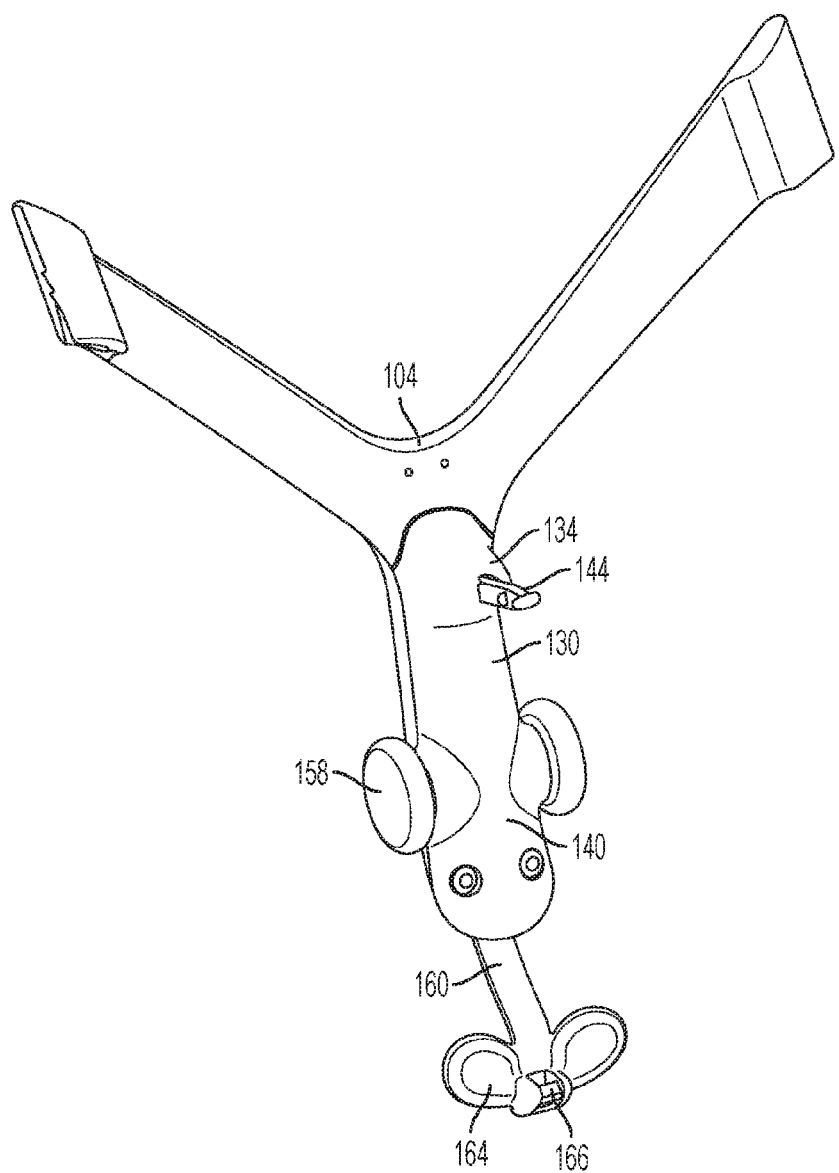
FIG. 5 is a front perspective view the yoke and adjustment mechanism of FIG. 3.
Figure 6:
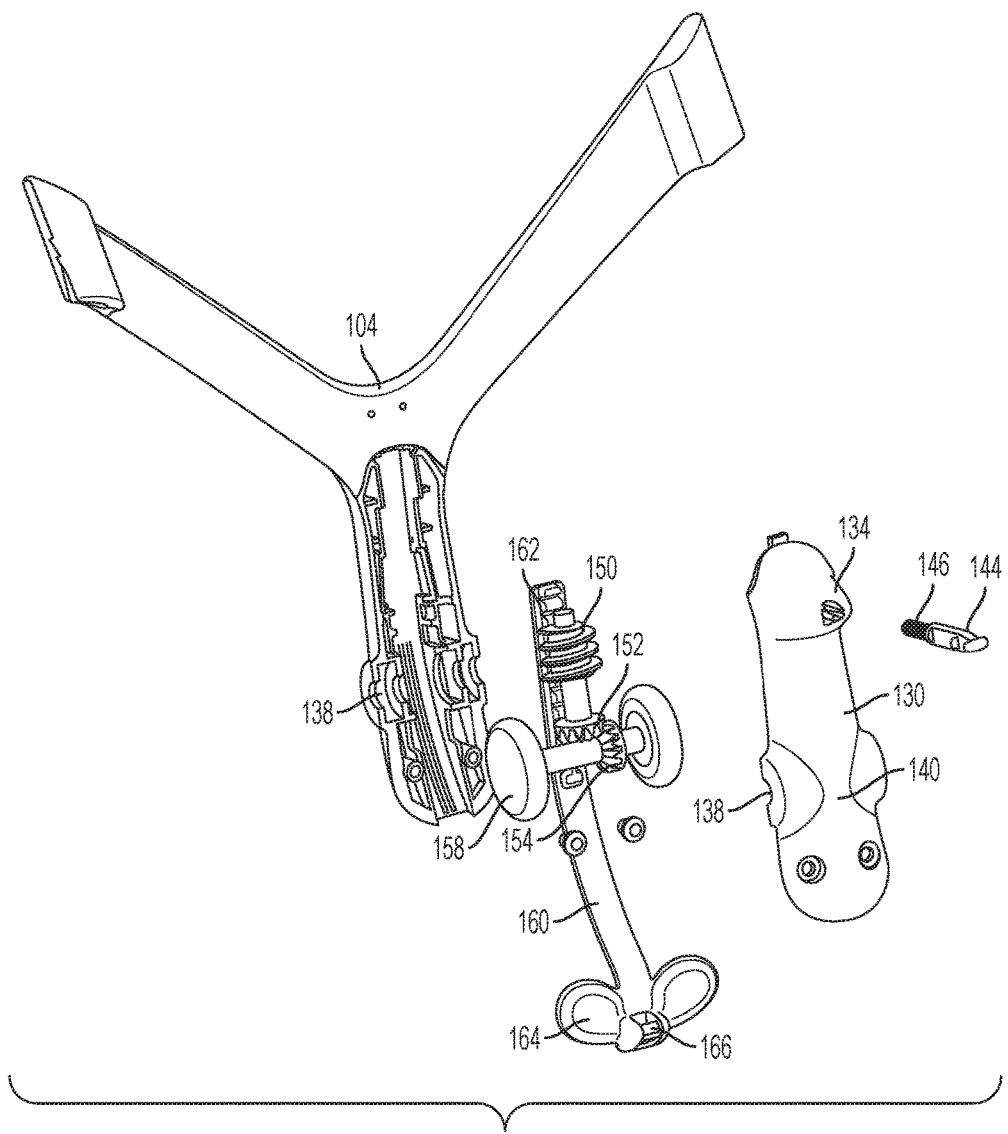
FIG. 6 is an exploded view of FIG. 5.
Figure 7:
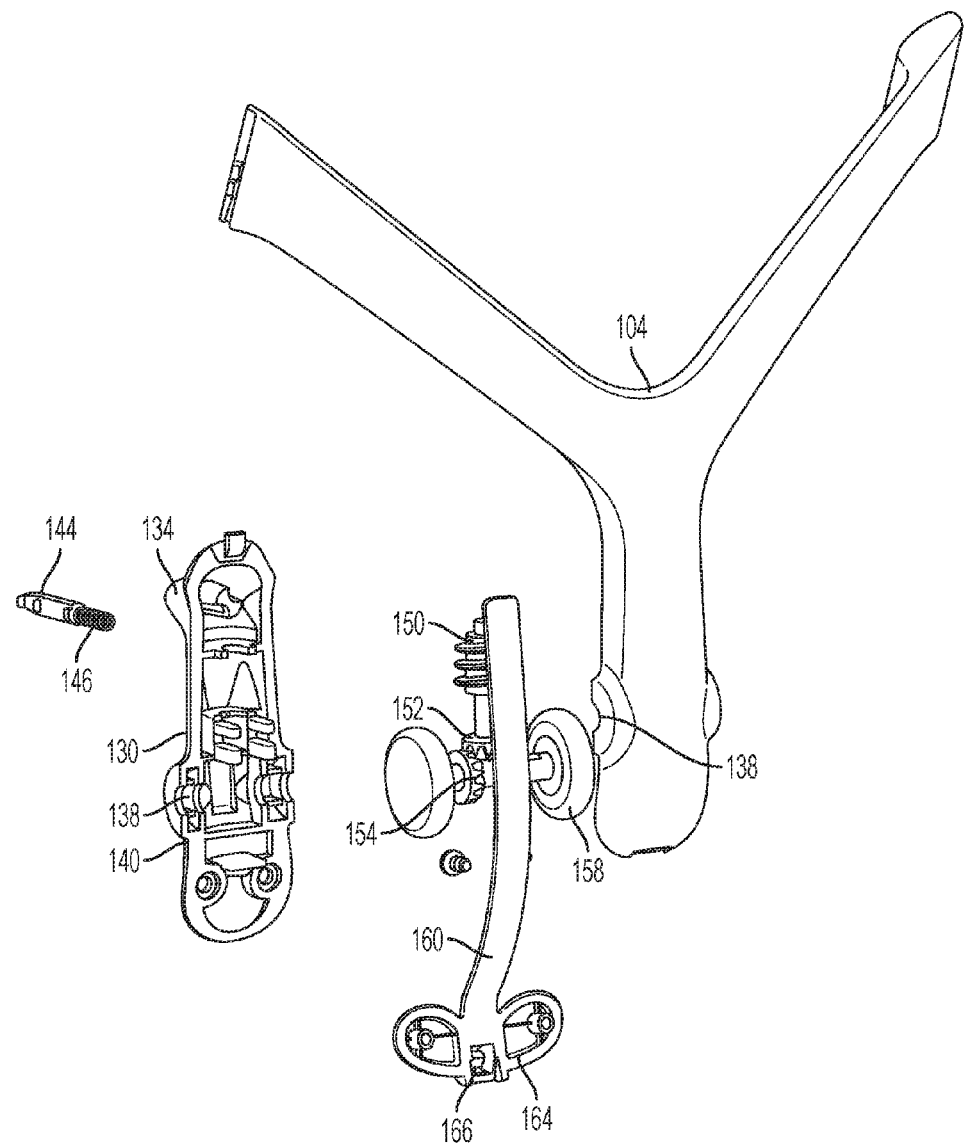
FIG. 7 is a rear perspective view of FIG. 6.
Figure 8:
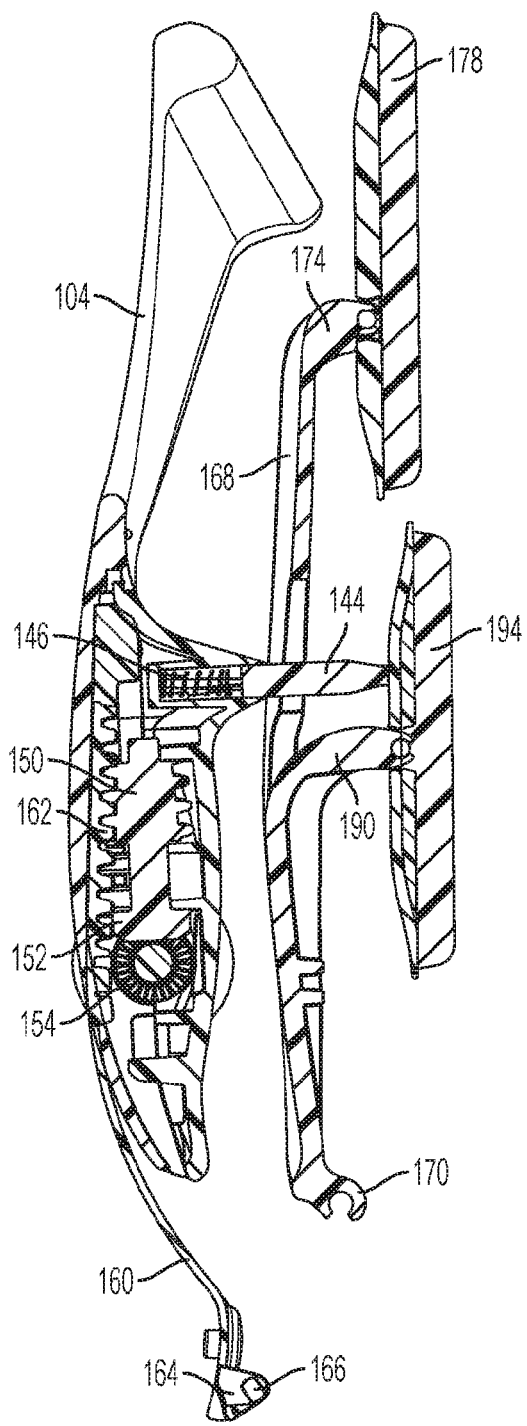
FIG. 8 is a side, sectional view of the back support shown FIG. 3.
Figure 9:
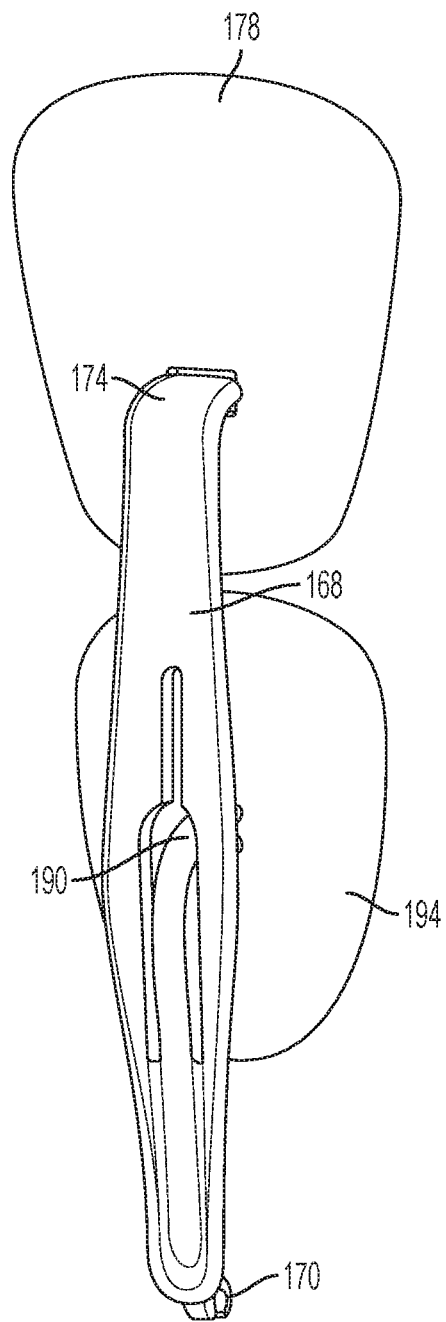
FIG. 9 is a rear perspective view of an exemplary stem and support pads.
Figure 10:
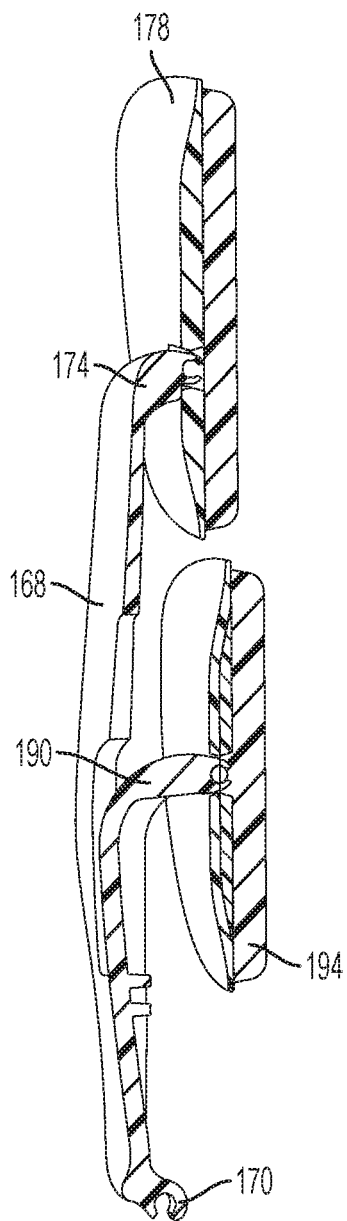
FIG. 10 is a side, sectional view of FIG. 9.

According to various exemplary embodiments, the lower portion 122 of the yoke 104 is configured as a housing having an interior cavity as shown in FIGS. 5-7. A cover 130 closes the cavity. The interior contains a plunger assembly and at least portion of the adjustment mechanism 108. The cover 130, or another front portion of the housing, has a forward extending protrusion 134 with an opening through which at least a portion of the plunger assembly extends. An opening, such as slot or channel 138, is formed in a lower portion 140 of the housing through which at least a portion of the adjustment mechanism extends.

As best shown in FIGS. 5-8, the plunger assembly is positioned inside of, and extends from, the extending protrusion 134. The plunger assembly includes a pin 144 received in the opening of the extending protrusion 134. A biasing member 146 is positioned around a portion of the pin 144 to biases the pin 144 forward through the opening in the extending protrusion 134.

According to various exemplary embodiments, the adjustment methanism 108 includes a gear, a grippable member, and an adjustment member as shown in FIGS. 5-8. The gear can be configured as a worm gear 150. The worm gear 150 has a shaft captured by bearing supports in the housing, and/or on the cover 130. The worm gear 150 rotates about a substantially vertical axis, or an axis generally aligned within and along the lower portion 122 of the yoke 104. The adjustment mechanism includes a driven gear 152 coaxially mounted with the worm gear 150 and rotatable therewith about a longitudinal axis. A drive gear 154 is rotatably mounted about an axis substantially orthogonal to the longitudinal axis. The driven and drive gears 152, 154 are configured as bevel gears with meshing teeth.

The drive gear 154 includes a shaft that extends laterally outwardly from the yoke 104. A grippable member, such as a knob 158, is fixed to the shaft. In some embodiments, a pair of grippable members may be secured to the shaft on opposite sides of the yoke 104 to maximize accessibility to the user. In various exemplary embodiments, the knob is directly fixed to the shaft of the worm gear 150, thereby eliminating the need for the drive and driven gears. The user rotates the knob 158, which in turn rotates the worm gear 150, either directly or through the drive and driven gears 154, 152. In this way, the adjustment mechanism is adjustable to a plurality of positions. It should be understood that the worm gear 150 provides for infinite and continuous adjustment of the yoke 104, meaning it can be adjusted to any position between a maximum and minimum depth, and is not limited to discrete positions. It should be understood that the adjustment mechanism may be attached to the frame.

Figure 14:
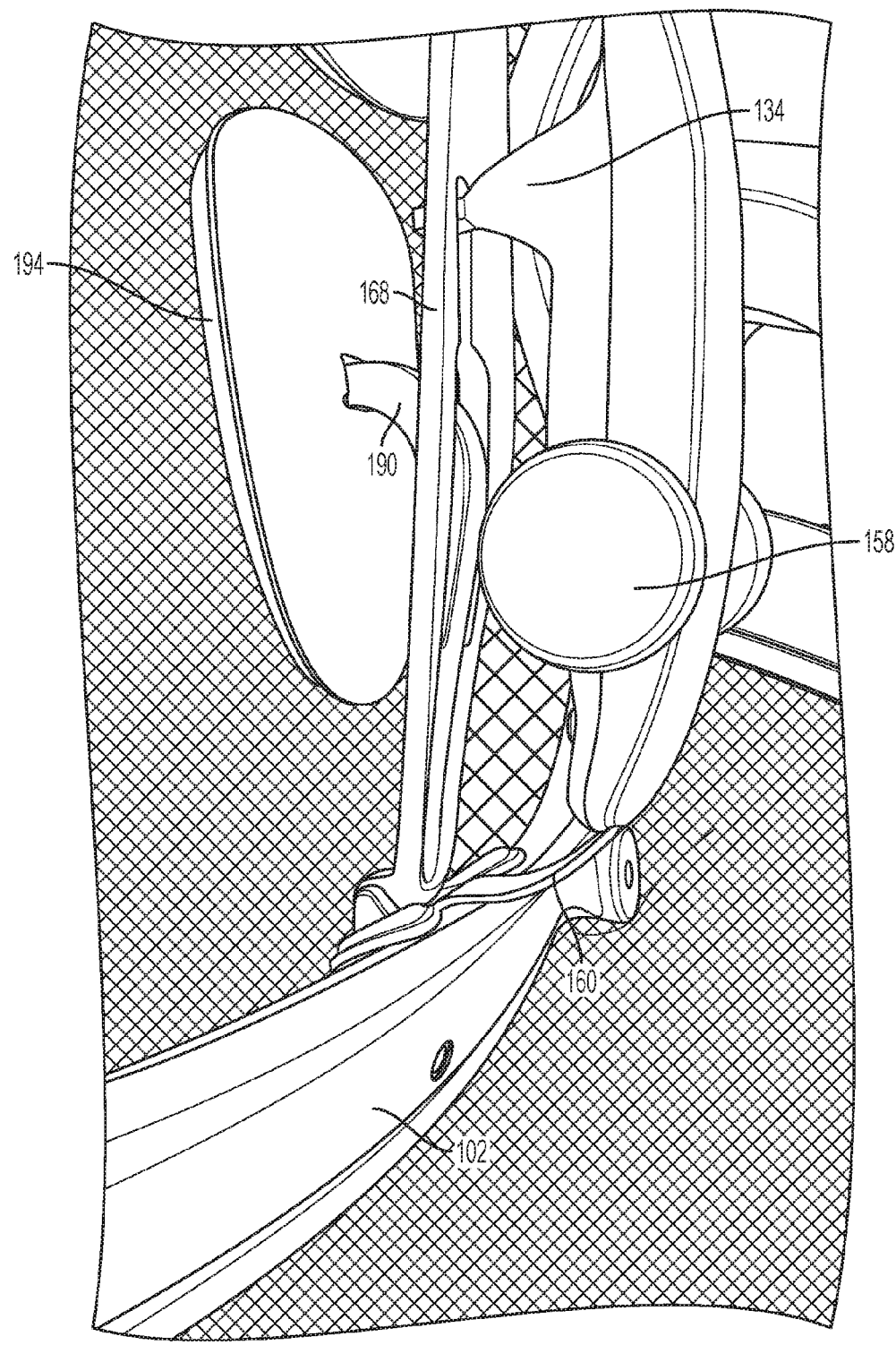
FIG. 14. is a rear perspective view of an embodiment of a backrest.

In various exemplary embodiments, the adjustment member is configured as a flexible tether or strap 160. A first portion or end of the strap is configured with a plurality of teeth 162, forming a linear rack or gear. The teeth 162 are spaced apart so as to mate and mesh with the worm gear 150. The strap 160 extends through the opening in the housing, with the teeth 162 engaged by the worm gear 150. A second portion or end of the strap is configured with an attachment portion 164 and a pivot member, such as an axle 166. The attachment portion 164 includes a first side member and a second side member configured to connect to the frame 102. The side members can include openings and bosses for receiving a fastener that extends into a bottom member of the frame 102, as shown in FIG. 14.

In operation, the user rotates the knob 158, and thereby rotates the worm gear 150, which engages the teeth 162 and translates the strap 160 relative to the worm gear 150. As the strap 160 is translated, the length of the strap 160 relative to the frame and yoke 104 is varied. As the length of the strap 160 between the frame 102 and yoke 104 is varied, the yoke 104 is pivoted toward or away from the frame 102 and user. It should be understood that the overall length of the strap 160 is fixed, but that the length of the strap 160 between the yoke 104 and frame 102 is varied, or changed, so as to effect movement of the yoke 104 relative to the frame 102. For the sake of clarity, the support strap is shown detached from the frame 102 in FIGS. 5-8, with the understanding that in use and operation, the strap 160 is connected to a portion of a chair, for example the frame 102.

As best shown in FIGS. 8-11, the stem 168 includes a upright member having a proximal, or lower end, and a distal or upper end. The lower end is supported, for example by the frame 102 and the strap 160. The lower end can include a substantially C-shaped member defining a channel that forms a lower hinge socket 170. The lower hinge socket 170 receives the axle 166 formed on the strap 160 and defines a pivot axis. It should be understood that the lower end may be otherwise connected to the frame 102 or the yoke 104, with the stem 168 being pivotable by way of bending of the upright members about a virtual pivot axis. The upper end is a free end that is moveable with respect to the lower end, either through pivoting about the axle 166 or through a cantilever connection with the stem 168 to the frame 102 or through a cantilever joint positioned elsewhere along the stem 168.

Figure 11:
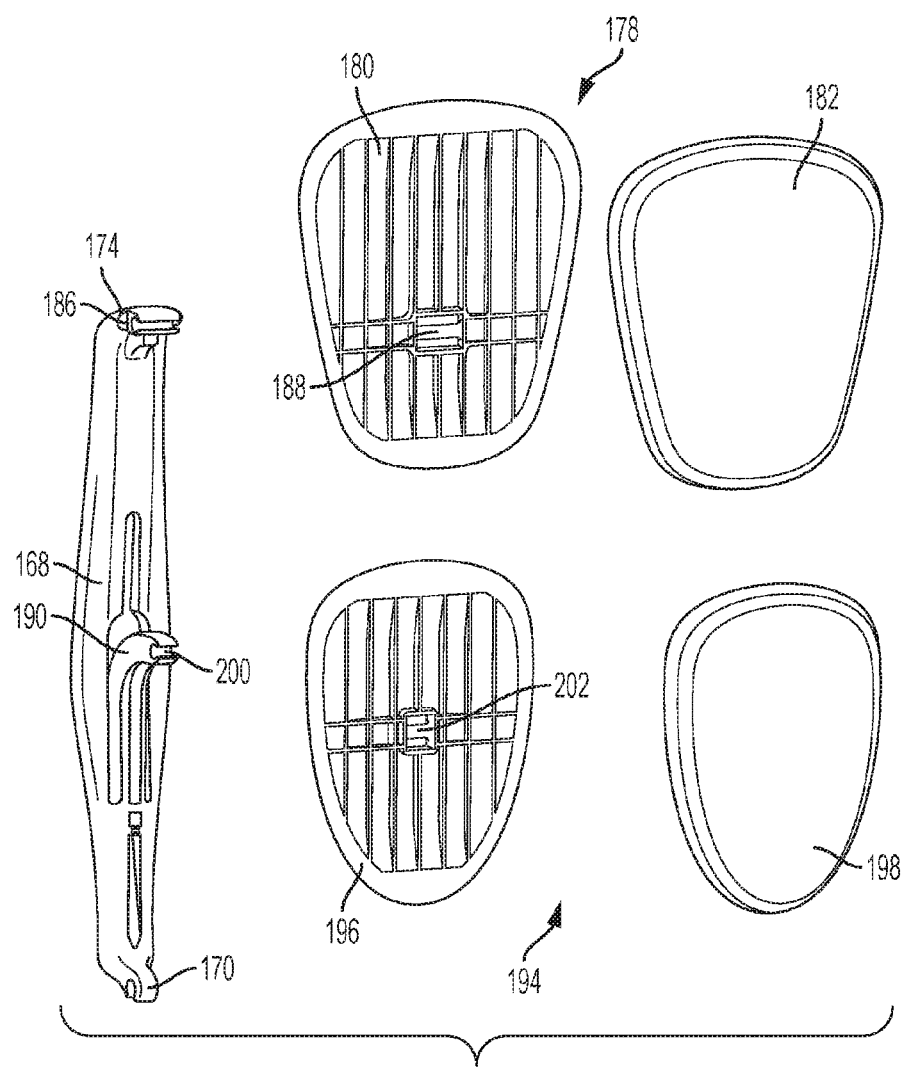
FIG. 11 is a front perspective, exploded view of FIG. 9.
Figure 12:
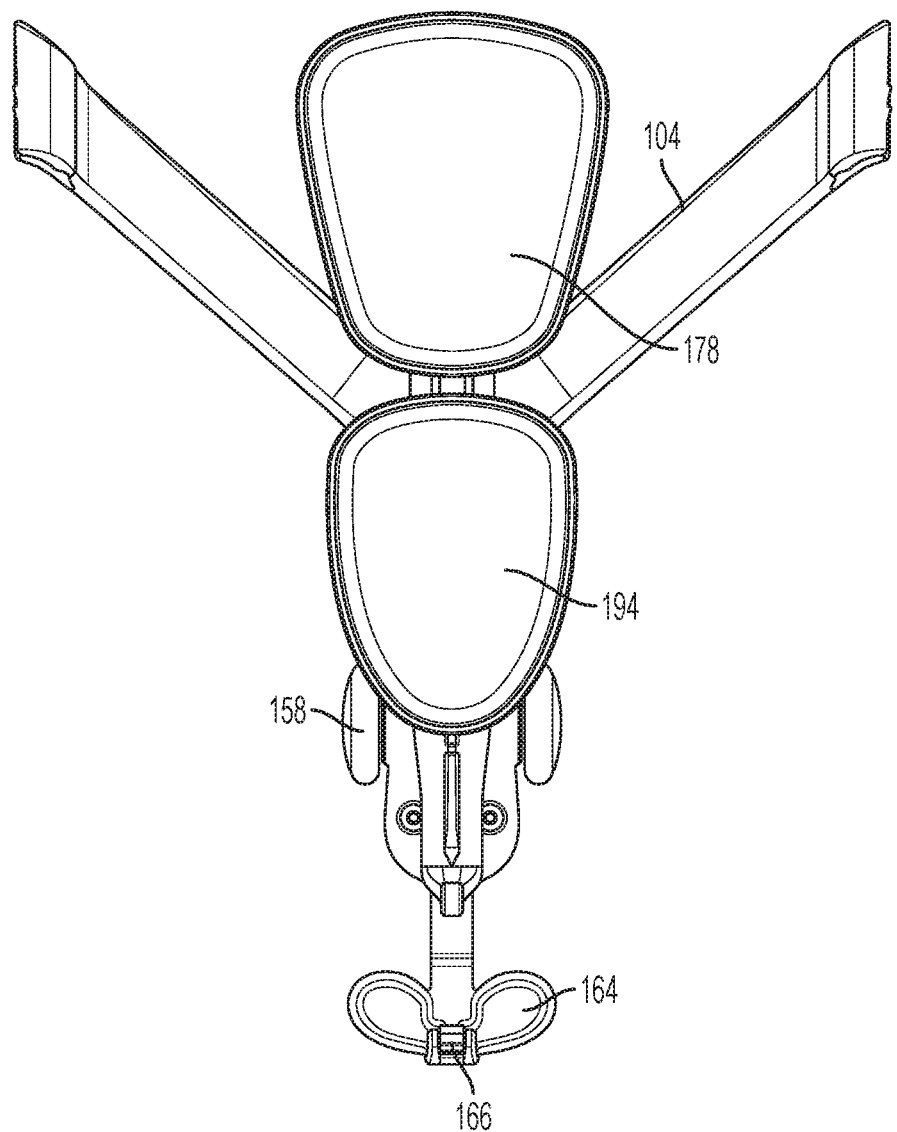
FIG. 12 is a front view of the support shown in FIG. 3.
Figure 13:
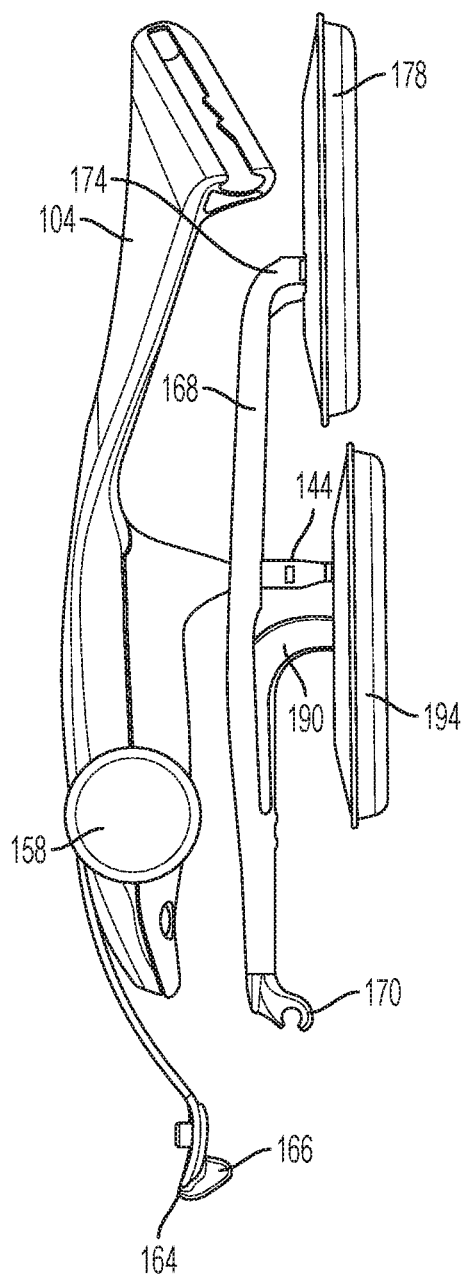
FIG. 13 is a side view of the support shown in FIG. 3.

The stem includes a first beam 174 having a first support pad 178 attached to the distal end of the upright member. As shown in FIG. 11, the first support pad 178 includes a first backing member 180 and a first cushion member 182, although a single piece support pad or more than two pieces can also be used. In some embodiments, a pivot joint is formed between the first beam 174 and the first support pad 178. For example the first beam can include a substantially C-shaped member defining a channel that forms an upper hinge socket 186. The first hacking member 180 can include an axle 188. The upper hinge socket 186 receives the axle 188 formed on the first backing member 180, defining a pivot axis for the first support pad 178. In an exemplary embodiment the first support pad is a lumbar support pad.

The stem also includes a second beam 190 that can be moved with the first beam 174 and also independently of the first beam 174. In various exemplary embodiments, the first beam 174 with a space or opening separating portions of the first beam 174 and the second beam 190. The second beam has a base and a curved upper member that extends outward from the first beam 174 towards a user area. A pivot joint is formed at the base of the second beam 190 such that the first and second beams 174, 190, have upper portions that are independently flexible, while the lower portion thereof is coupled to and pivoted about a common axis.

A second support pad 194 is connected to the second beam 190. As shown in FIG. 11, the second support pad 194 includes a second hacking member 196 and a second cushion member 198, although a single piece support pad or more than two pieces can also be used. In some embodiments, a pivot joint is formed between the second beam 190 and the second support pad 194. For example the second beam 190 can include a substantially C-shaped member defining a channel that forms a middle hinge socket 200. The second hacking member 196 can include an axle 202. The middle hinge socket 200 receives the axle 202 formed on the second backing member 196, defining a pivot axis for the second support pad 198. In an exemplary embodiment the second support pad 198 is a sacral support pad.

Materials such as plastic materials (polypropylene, polyethylene, nylon 174, ABSGF 180, 196, or acetal for creep resistance) may be used to construct the support pads. It should also be recognized that the support pads may be constructed from a single material or a combination of materials to provide a variety of support or force creating effects on the sacrum of a user. In operation, the pad helps avoid the creation of any pressure points on the back of a user. The size, shape, and configuration of the support pads can be varied depending on the structure of the chair and the required support. In various exemplary embodiments, the support pads 178, 194 can include different pivoting mechanisms, such as relief slots.

In various exemplary embodiments, the protrusion 134 on the front cover 130 of the yoke 104 engages a rear surface of the upright member between the upper and lower ends. The rear surface may be configured with a channel, groove, or valley, to receive the protrusion. As the yoke 104 is moved in and out, or rotated about a first pivot axis, by translating the strap 160 relative to the frame 102, the stem 168 and the support pads 178, 194 are likewise moved in and out by pivoting about a second pivot axis at a location, which is positioned vertically below and spaced apart from the first pivot axis and location.

The stem 168 can also include a slot that extends above the second beam 190 to receive at least a portion of the plunger assembly as shown in FIG. 14. The biasing member 146 presses the pin 144 that presses against the second support pad 194. The plunger assembly pushes the second support pad 194 forward in an unloaded position to make contact with a chair back, for example the flexible mesh portion of the backrest. In the unloaded position, the plunger assembly presses the second support pad 194 against the backrest presenting a protruding portion in the flexible mesh. When a user sits in the chair the plunger assembly is compressed.

As shown, the various support pads 178, 194 have a forwardly facing support surface that is engaged with a rear surface of the suspension material. In other embodiments, the support pads may directly support the user, or may be embedded or provided interiorly to a backrest structure, including for example a cushion.

It should be appreciated that the various embodiments are effective for both static and dynamic user activity in a variety of postural positions, ranging from aggressive task to fully recumbent.

The foregoing detailed description of the certain exemplary embodiments has been provided for the purpose of explaining the general principles and practical application, thereby enabling others skilled in the art to understand the disclosure for various embodiments and with various modifications as are suited to the particular use contemplated. This description is not necessarily intended to be exhaustive or to limit the disclosure to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

As used in this application, the terms "front," "rear," "upper," "lower," "upwardly," "downwardly," and other orientational descriptors are intended to facilitate the description of the exemplary embodiments of the present disclosure, and are not intended to limit the structure of the exemplary embodiments of the present disclosure to any particular position or orientation. Terms of degree, such as "substantially" or "approximately" are understood by those of ordinary skill to refer to reasonable ranges outside of the given value, for example, general tolerances associated with manufacturing, assembly, and use of the described embodiments.

What is claimed is:

1. A back support structure comprising:
   a frame;
   a support comprising an upright member having a lower end and a upper end, the lower end of the upright member connected to the frame at a first location, and a support pad connected to the upper end of the upright member;
   a fulcrum member having an upper portion and a lower portion, the upper portion connected to the frame at a second location spaced vertically above the first location, the fulcrum member comprising a fulcrum engaging the upright member between the upper and lower ends, wherein the fulcrum member is moveable between a plurality of fulcrum positions; and
   an adjustment mechanism includes an adjustment member connected to the frame and the lower portion of the fulcrum member, wherein the adjustment member is adjustable so as to move the fulcrum member to the plurality of fulcrum positions.

2. The back support structure of claim 1, wherein the upright member is pivotally connected to the frame at the first location.

3. The back support structure of claim 1, wherein the support pad comprises a first support pad, and the support further comprises a second support pad connected to the upright member below the first support pad.

4. The back support structure of claim 3, wherein said upright member comprises a first beam and a second beam, and the first support pad is pivotally connected to the first beam and the second support pad is pivotally connected to the second beam.

5. The back support member of claim 1, wherein the adjustment member comprises a flexible tether and the adjustment mechanism varies a length of the flexible tether extending between the frame and the lower portion of the fulcrum member.

6. The back support member of claim 1, wherein the adjustment member comprises a strap having a plurality of gear teeth, and the adjustment mechanism comprises a gear meshing with the gear teeth of the strap.

7. The back support member of claim 6, wherein said gear comprises a worm gear, and the adjustment mechanism further comprises a driven gear coupled to the worm gear, a drive gear meshing with the driven gear, and a grippable member coupled to the drive gear, wherein the grippable member and the drive gear are rotatable about a first axis, and wherein the driven gear and the worm gear are rotatable about a second axis in response to rotation of the grippable member and the drive gear about the first axis.

8. The back support member of claim 7, wherein the worm gear, the drive gear, the driven gear, and the plurality of gear teeth are positioned inside the fulcrum member.

9. A back support comprising:
   a frame;
   a stem having a lower portion connected to the frame and an upper portion, wherein the upper portion is moveable with respect to the lower portion;
   a first support pad pivotally connected to the upper portion of the stem;
   a second support pad pivotally connected to the stem between the upper portion and the lower portion;
   a yoke connected to the frame and having a protrusion engaging the stem, the yoke configured to pivot about a first axis; and
   an adjustment mechanism configured to pivot the yoke about the first axis.

10. The back support of claim 9, wherein the stem includes a first beam and a second beam, and the first support pad is pivotally connected to the first beam and the second support pad is pivotally connected to the second beam.

11. The back support of claim 10, wherein the first and second beams are pivot together about the lower portion of the stem, and the first beam is independently flexible of the second beam.

12. The back support of claim 9, wherein the first support pad is pivoted independently of the second support pad.

13. The back support of claim 12, wherein the first support pad includes a first axle, the second support pad includes a second axle, and the stem includes a first hinge socket receiving the first axle and a second hinge socket receiving the second axle.

14. The back support of claim 9, wherein the protrusion includes an opening and a plunger assembly extends at least partially through the opening to engage the second support pad.

15. The back support of claim 14, wherein the plunger assembly includes a pin and a biasing member biasing the pin toward the second support pad.

16. The back support of claim 9, wherein the adjustment mechanism comprises a strap having a first end connected to the frame and a second end connected to the yoke.

17. The back support of claim 16, wherein the first end of the strap includes an axle and the lower portion of the stem includes a hinge socket receiving the axle to pivotally connect the stem to the strap.

18. The back support of claim 16, wherein the adjustment mechanism comprises a gear mechanism positioned in the yoke for adjusting a length of the strap between the yoke and the frame.

19. A method for adjusting a back support structure comprising:
pivotably supporting an upright member about a first axis;
pivotably supporting a fulcrum member about a second axis, wherein the second axis is spaced apart from the first axis;
engaging the upright member with the fulcrum member between the first and second axes;
translating a strap attached to the fulcrum member;
pivoting the fulcrum member about the second axis in response to translating the strap; and
pivoting the upright member about the first axis in response to pivoting of the fulcrum member.

20. The method of claim 19 wherein translating the strap comprises rotating a gear engaged with the strap.

* * * * *